(12) United States Patent
Minowa et al.

(10) Patent No.: US 6,768,557 B1
(45) Date of Patent: Jul. 27, 2004

(54) INTERFACE DEVICE, CONTROL METHOD FOR THE SAME, AND DATA STORAGE MEDIUM FOR RECORDING THE CONTROL METHOD

(75) Inventors: Masahiro Minowa, Suwa (JP); Kazuhisa Aruga, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/500,133

(22) Filed: Feb. 8, 2000

(30) Foreign Application Priority Data

Feb. 8, 1999 (JP) .......................................... 11-030035
Jan. 18, 2000 (JP) ....................................... 2000-009345

(51) Int. Cl.[7] .............................. G06F 3/12; G06F 13/00
(52) U.S. Cl. ...................................... 358/1.15; 358/1.14
(58) Field of Search ............................... 358/1.15, 1.14, 358/1.13, 409, 411, 426.09, 434, 436, 439, 442; 710/1–5, 7, 15–19, 48; 709/310, 311, 321, 323, 324, 326, 327

(56) References Cited

U.S. PATENT DOCUMENTS

| | | | | |
|---|---|---|---|---|
| 4,071,909 A | * | 1/1978 | Geller | ..................... 340/172.5 |
| 5,485,590 A | | 1/1996 | Hyatt et al. | ................. 395/442 |
| 5,594,653 A | | 1/1997 | Akiyama et al. | ...... 364/468.24 |
| 6,513,088 B2 | * | 1/2003 | Arai et al. | ................... 710/305 |
| 6,546,123 B1 | * | 4/2003 | McLaren et al. | ........... 382/128 |

FOREIGN PATENT DOCUMENTS

| | | | |
|---|---|---|---|
| EP | 0 096 407 | 12/1983 | ............. G06F/3/12 |
| EP | 0 654 757 | 5/1995 | .......... G06K/15/00 |
| EP | 0 750 251 | 12/1996 | ............. G06F/3/13 |
| EP | 0 769 737 | 4/1997 | ............. G06F/3/12 |
| EP | 0 811 947 | 12/1997 | .......... G06K/15/00 |
| JP | 9-323463 | 12/1997 | ............ B41J/29/38 |
| JP | 10-333856 | 12/1998 | ............. G06F/3/12 |

* cited by examiner

*Primary Examiner*—Gabriel Garcia
*Assistant Examiner*—Douglas Tran

(57) ABSTRACT

An interface device for a printer, a control method for the interface device, and a data storage medium for storing the control method. The receiver part of the interface device receives data sent by a host computer, and the transmitter part of the interface device sends received data to the printer through the printer expansion slot to which the interface device is installed. A detector detects whether the printer can receive data. Memory stores received data when the detector determines that the printer cannot receive data. A real-time command transmission controller assures that real-time commands are sent to the printer even when the printer cannot receive other data because the receive buffer is full, for example.

12 Claims, 12 Drawing Sheets

INTERFACE DEVICE, CONTROL METHOD FOR THE SAME, AND DATA STORAGE MEDIUM FOR RECORDING THE CONTROL METHOD

BACKGROUND OF THE INVENTION

1. Field of the Invention

The present invention relates to an interface device for a printer, to a control method for said interface device, and to a data storage medium for recording said control method. More specifically, the present invention relates to a printer interface device that is installed to an expansion slot of the printer and connected to a host computer for monitoring the buffering status of the printer while receiving command data sent from the host computer, appropriately buffering the received command data, and forwarding the command data to the printer. The present invention further relates to a control method for said interface device, and to a data storage medium for recording said control method.

2. Description of the Related Art

Various interfaces for connecting a printer and a host computer have been proposed and are currently in use. Some common interfaces use the host computer's parallel port or RS-232 port, or an IEEE (Institute of Electrical and Electronic Engineers) 1284 port. Other more recent interfaces use the USB (Universal Serial Bus) standard or a communications network to which the host computer is connected.

Command data sent by the host computer through such an interface to a printer is a byte stream expressing print commands instructing the printer to perform a process for printing some text or graphic data, and commands for processes controlling the printer.

While shape and design of the connector typically vary according to the interface standard, it is desirable for the printer hardware to be the same even if the method of connecting to the host computer changes. More specifically, while users may replace the host computer, they commonly want to continue using the same printer.

This problem is addressed in part by using an interface device to receive data and commands sent in a format conforming to the specific type of connector, perform such tasks as voltage conversion, impedance matching, buffering, interpreting, and filtering the received data and commands, and finally converting to and outputting the data and commands in the, e.g., RS-232 or other specific port format of the printer.

This makes it possible to use a single printer in a variety of situations by simply replacing the interface device. More specifically, a single basic printer can be supplied for use with various interface standards by varying the interface device used with a particular printer. It is therefore possible to mass produce the printer, and thereby reduce the overall cost of the printer.

Command data is buffered as described below by conventional interface devices. That is, when the host computer sends command data to the interface device, the interface device sends the received command data to the printer in the sequence received. The printer then stores the command data in a receive buffer. The printer notifies the host computer when the receive buffer of the printer becomes full by sending an appropriate signal to the host computer via a busy signal bus or by using an Auto Status Back (ASB) function as taught in Japanese Unexamined Patent Application (kokai) 7-137358. When the host computer is thus notified that the printer's receive buffer is full, it stops sending print data.

There is, however, great demand for further improving the processing speed of the host computer and the printing speed of the printer without changing the printer itself by using the interface device built in to the printer to appropriately buffer data.

Furthermore, when the printer is compatible with real-time commands such as taught in Japanese Unexamined Patent Application (kokai) 10-333856 and the interface device receives a real-time command, the ability to respond to on-demand data requests from the host computer and not simply store the real-time command to a buffer is required.

OBJECTS OF THE INVENTION

Therefore, it is an object of the present invention to overcome the aforementioned problems.

Our invention solves this problem by providing a printer interface device that can be installed to an expansion slot of the printer and connected to a host computer for monitoring the buffering status of the printer while receiving command data sent from the host computer, appropriately buffering the received command data, and forwarding the command data to the printer. Our invention further provides a control method for theinterface device, and a data storage medium for recording the control method.

Our invention further relates to a printer interface device that, when there is command data that should be transferred to the printer with priority over data received by the interface device, reliably transfers such command data to the printer and buffers the received data according to the properties of the command data from the host computer. We also provide a control method for this interface device, and a data storage medium for recording the control method.

SUMMARY OF THE INVENTION

To achieve the above object, an interface device according to the present invention is described below in accordance with the principles of the invention. An interface device according to the present invention can be installed to an expansion slot of a printer, and comprises (a) a receiver for receiving data sent by a host computer connected to the interface device; (b) a transmitter for sending this data to a printer in which the interface device is installed; (c) a detector for detecting whether the printer can receive the data; and (d) a real-time command transmission controller for controlling the transmitter to send data received by the receiver when the data is a real-time command even if the detector detects that the printer cannot receive data.

According to the present invention, the interface device interprets real-time commands and sends them to the printer even when the printer cannot receive data because, for example, the printer's receive buffer is full or the printer is off line because the cover is open. When a normal command, that is, a command other than a real-time command or similar priority command, is received, and the printer cannot receive the command data, the interface device enables the received data to be stored in internal memory.

An interface device according to the present invention can be installed to an expansion slot of a printer, and comprises a receiver, transmitter, detector, memory, and a controller.

The receiver receives data sent from the host computer to which the interface device is connected.

The transmitter sends data to the printer through the expansion slot in which the interface device is installed.

The detector detects whether the printer can receive data.

The memory stores data received by the receiver when the detector detects that the printer cannot receive data.

When the detector detects that the printer can receive data, the controller controls the transmitter to send data stored to memory and then send data received by the receiver after it detects that the printer can receive data.

An interface device according to the present invention can further comprise a discriminator and a notifying means.

The discriminator in this case detects if further data can be stored to memory.

The notifying means notifies the host computer when the discriminator detects that further data cannot be stored.

The transmitter of an interface device according to the present invention can have a connector conforming to the RS-232 standard.

An interface device according to the present invention can also be configured to a size that will fit within the printer housing when it is installed to an expansion slot of the printer.

An interface device according to the present invention further preferably comprises a real-time command transmission controller.

This real-time command transmission controller controls the transmitter to send data received by the receiver when the data is a real-time command when the detector detects that the printer cannot receive data.

This interface device according to the present invention can also be designed so that when the real-time command transmission controller controls the transmitter to send real-time command data to the printer, the data is not stored in memory.

Yet further, an interface device according to the present invention can be designed so that when data sent by the transmitter is interrupted and is in the middle of a data sequence for another command, the real-time command transmission controller controls the transmitter to send real-time command data after completing transmission of this data sequence for another command.

It is therefore possible to prevent real-time command data from interrupting transmission of another command data sequence. This configuration of an interface device according to the present invention thus detects whether a command is currently being transmitted, and delays transmission of real-time command data until it is not in the middle of a command transmission, that is, until there is a break between commands.

A control method for an interface device that can be installed to an expansion slot of a printer comprises a receiving step, a detecting step, a storage step, and a transmission step.

In this method, data sent by the host computer is received in the receiving step.

The detecting step detects whether the printer can receive data.

The storage step stores data received in the receiving step when the detecting step detects that the printer cannot receive data.

The transmission step sends data stored in the storage step to the printer, and then sends data received in the receiving step to the printer, when the detecting step detects that the printer can receive data.

A control method for an interface device according to the present invention further preferably comprises a discriminating step and a notifying step.

The discriminating step detects if further data can be stored to memory.

The notifying step notifies the host computer when the discriminating step detects that further data cannot be stored.

Additionally, a control method for an interface device according to the present invention comprises a real-time command transmission step.

The real-time command transmission step sends data received in the receiving step when the data is a real-time command and when the detecting step detects that the printer cannot receive data.

Further, the storage step for storing data is not performed in this interface device control method when real-time command data is sent to the printer in the real-time command transmission step.

According to the interface device control method of the present invention, the real-time command transmission step completes sending a data sequence for a command other than a real-time command, and then sends the real-time command data, when data sent to the printer is interrupted and is in the middle of a data sequence for another command.

A program for controlling an interface device according to the present invention can be stored to such computer-readable data storage media as a Compact Disc (CD), floppy disk, hard disk, magneto-optical disk, Digital Video Disc (DVD), and magnetic tape.

In addition, a program for controlling an interface device according to the present invention can be loaded into a server computer for the World Wide Web (WWW) so that users can download the program from the server, save the program to a local interface device to update the interface device control program so that the program according to the present invention is run by the interface device.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings, wherein like reference symbols refer to like parts.

DESCRIPTION OF THE PREFERRED EMBODIMENTS

The preferred embodiments of the present invention are described below with reference to the accompanying figures. It should be noted that the preferred embodiments described below are simply exemplary of the present invention and shall not limit the scope of the accompanying claims. It will therefore be obvious to one with ordinary skill in the related art that numerous variations shall be possible by replacing the elements described below in whole or in part with an equivalent part or parts, and such variations are included within the scope of the present invention.

Embodiment 1

Figure 1:
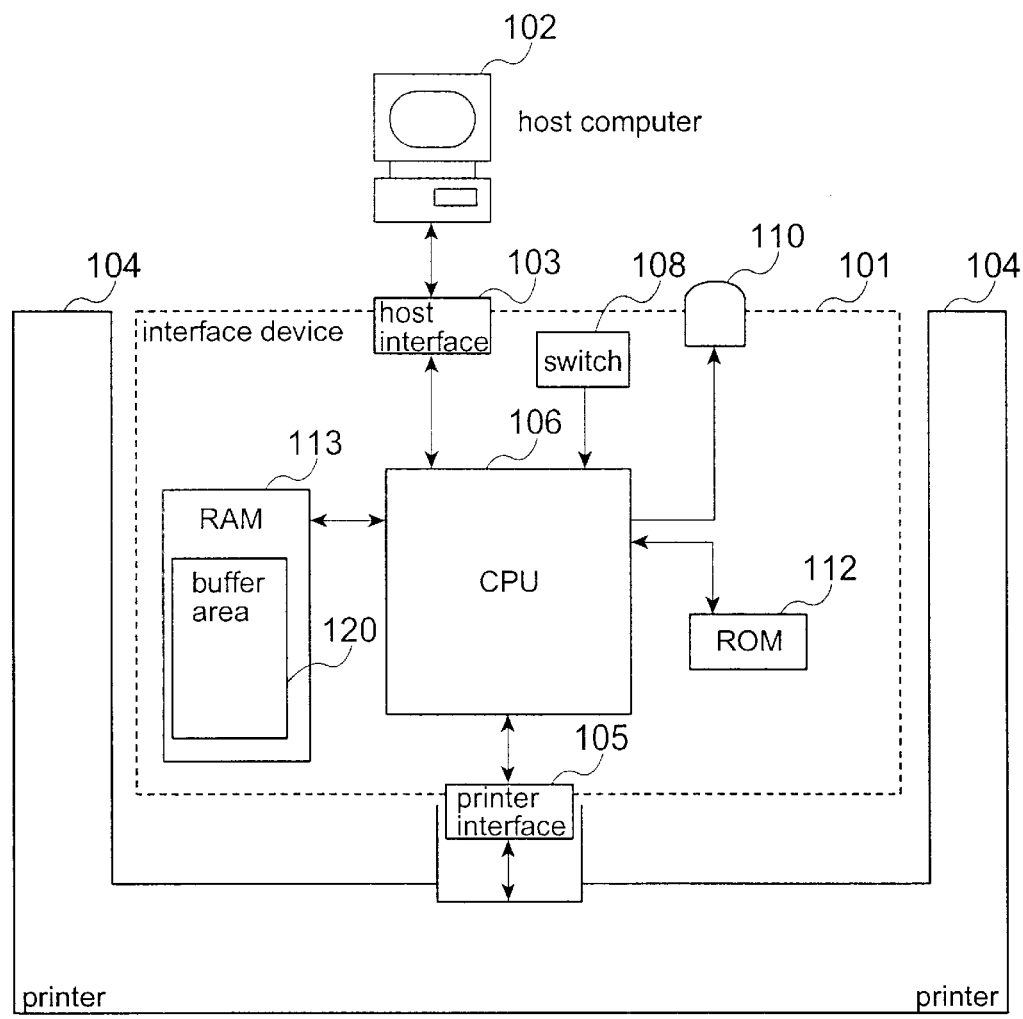
FIG. 1 is a block diagram of an interface device according to a first embodiment of the present invention.

FIG. 1 is a block diagram of an exemplary interface device according to a first embodiment of the present invention.

The interface device 101 is connected to a host computer 102 by way of intervening host interface 103, and receives data sent from the host computer 102.

The interface device 101 is further connected by way of printer interface 105 to printer 104, and sends command data received from the host computer 102 to the printer 104. Based on the print commands in the received command data, the printer 104 prints text and images to the paper, film, or other printing medium. Various printer operations and settings are also controlled based on the various control setting commands contained in the received command data.

The host interface 103 and printer interface 105 can be compatible with various standards and protocols to enable, for example, serial data transmissions conforming to the RS-232 standard, parallel data transmissions conforming to the Centronics standard, network connection via an Ethernet 10 Base-T, 100 Base-T, or other networking protocol, or even the new USB or other new data transmission standard.

Signal level conversions can be easily accommodated by providing a driver circuit for level conversions appropriate to the host interface 103 or printer interface 105 when the TTL (transistor-transistor logic) circuit drive voltage of the host computer 102 or printer 104 differs from the internal drive voltage of the interface device 101.

Cost reduction can also be achieved by using a physical connector of an existing standard.

The printer interface 105 notifies the interface device 101 if the receive buffer of the printer 104 is full. The CPU (central processing unit) 106 can therefore determine whether data can be sent to the printer 104 by monitoring the printer interface 105. This detection is possible using the ASB function of the printer 104, or by detecting the busy signal state if the printer interface 105 has a busy signal line.

The CPU 106 monitors the host interface 103, and if data is received detects whether data can be sent to the printer 104. If data cannot be sent to the printer 104, the CPU 106 buffers the data until it can be sent. It should be noted that an interface device according to the related art is not provided with this buffering capability.

A buffer area 120 reserved in RAM (random access memory) 113 is used for buffering the command data. RAM 113 is also used for temporarily storing other data.

A program run by the CPU 106 is stored in ROM (read only memory) 112. When the printer 104 power is turned on and power supply to the interface device 101 begins, the CPU 106 reads this program from ROM 112 and begins to run the program to control interface device 101.

When power is turned on, the CPU 106 detects the setting of DIP switch 108 to set, for example, the data length, parity check, transmission rate, and other settings used for communications by the host interface 103 and printer interface 105.

The operating indicator 110 indicates whether or not the interface device is working. The communications status of host interface 103 and printer interface 105, and the processing status of the CPU 106, can be indicated by, for example, changing the indicator color or flashing state.

Note that the host interface 103 functions as the receiver and notifying means, the printer interface 105 functions as the transmitter and detector, the CPU 106 functions as the controller and discriminator, and RAM 113 functions as the storage means of the accompanying claims.

The ROM 112 also serves as a data storage medium for storing the program executed by the CPU 106. The BIOS (Basic Input Output System) program stored in ROM 112 can be implemented in a manner whereby it can be updated by the host computer 102, in which case a Compact Disc (CD), floppy disk, magneto-optical disk, hard disk, Digital Video Disc (DVD), magnetic tape, or other medium that can be read by host computer 102 can function as the data storage medium for storing the program executed by the CPU 106.

It should be noted that while the host interface 103, printer interface 105, operating indicator 110, ROM 112, and RAM 113 are described as being directly connected to the CPU 106 in the present embodiment described above, these can be alternatively connected indirectly to the CPU 106 by way of a bus.

Figure 2:
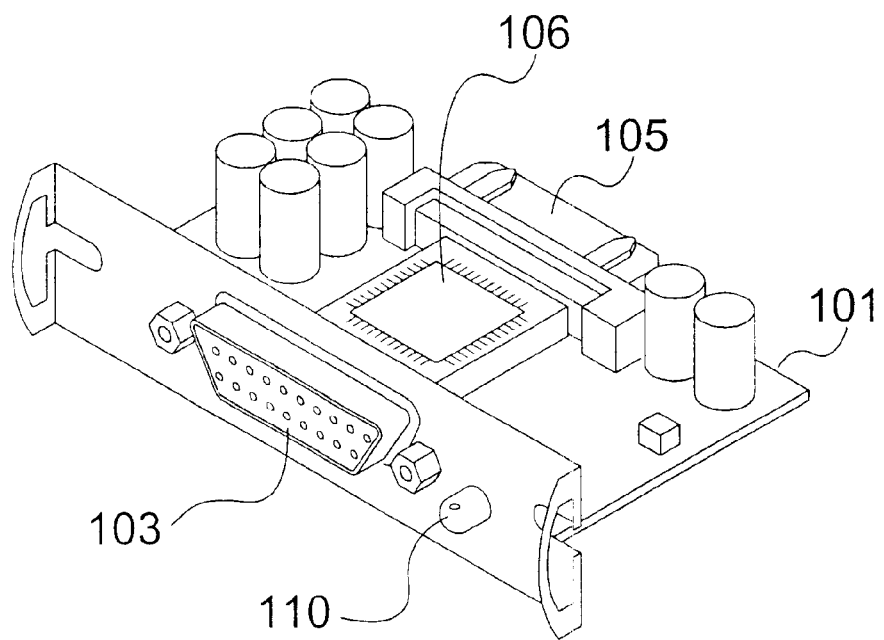
FIG. 2 is a plan view of an interface device according to the present invention.

FIG. 2 shows an example of an interface device according to the present invention.

The host interface 103 and operating indicator 110 for the interface device 101 are disposed at the back, or outside, of the interface device 101. The interface device 101 is further typically designed to a size that fits completely within the expansion slot of the printer 104. An interface device designed in this manner is also known as a printer expansion module.

By designing the interface device to this size, the host interface 103 and operating indicator 110 appear to be disposed in the back of the printer 104 when the interface device 101 is installed to the printer 104.

Furthermore, designing the interface device 101 to be installed to an expansion slot of the printer 104 also protects the interface device 101 from accidental contact and impact.

This type of interface device 101 design yet further helps to improve printer appearance and thus the aesthetics of an office in which the printer is used.

Data Transmission and Receiving

Figure 3:
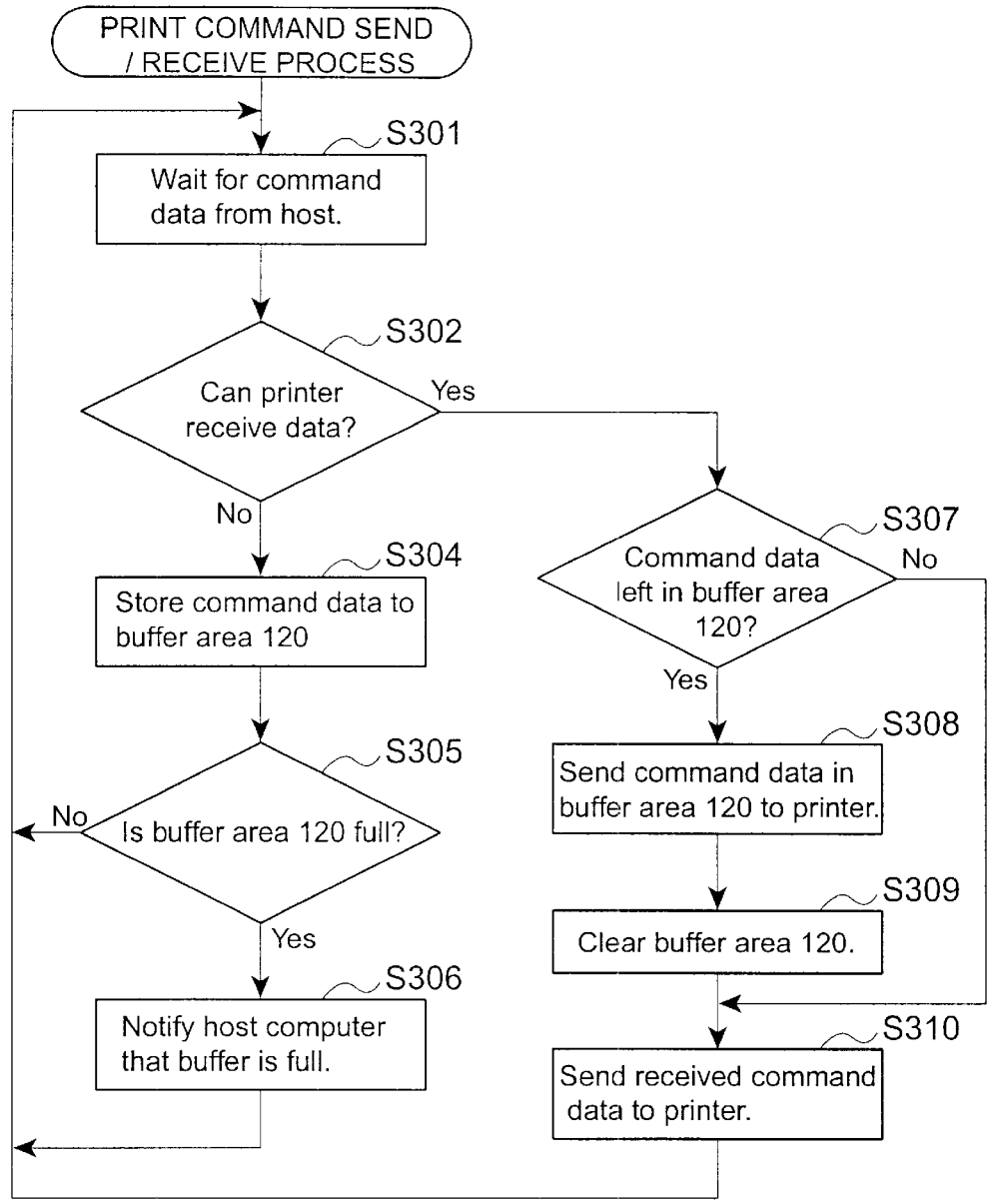
FIG. 3 is a flow chart used to describe a data send and receive process of an interface device according to the present invention.

The data transmission and receiving process of an interface device according to the present invention is described next below with reference to the flow chart of this transmission and receiving process shown in FIG. 3.

The CPU 106 first simply waits for command data sent from the host computer 102 to reach the host interface 103 (step S301).

The CPU 106 can operate in a co-routine processing mode in which control can be shifted to other processes during this standby mode. In this case the host interface 103 can assert a receive interrupt to the CPU 106 so that the CPU 106 leaves the standby mode and continues with the rest of the procedure.

When command data is received in step S301, the CPU 106 detects whether the printer 104 can receive command data (step S302). As noted above, the CPU 106 can detect whether the printer 104 is in a data receivable state directly by detecting the state of a busy signal bus, or indirectly by detecting the printer 104 status value sent by the ASB function and stored in RAM 113.

If the printer cannot receive data at this time (step S302 returns no), the data received in step S301 is stored to command data buffer area 120 in RAM 113 (step S304). As noted above, command data buffer area 120 is reserved in RAM 113. The command data buffer area 120 is typically a FIFO (first in, first out) type queuing buffer, and can thus be achieved using a ring buffer or similar technique.

When the printer 104 cannot accept any data and received data is therefore gradually accumulated in command data buffer area 120, the available storage capacity left in command data buffer area 120 gradually decreases. When there is no storage capacity left in the command data buffer area 120, it is said to be full.

After received command data is stored to the command data buffer area 120, it is determined in step S305 whether buffer area 120 is full. If it is (step S305 returns yes), the host computer 102 is notified that the buffer is full (step S306), and the procedure loops back to step S301. It should be noted that this can be accomplished based on a protocol similar to that of the ASB function, or using the busy signal line if the host interface is provided with a busy signal line.

If the buffer is not full (step S305 returns no), the procedure loops back to step S301. Alternatively, the host computer 102 can be notified that the buffer is not full.

By thus detecting and notifying the host computer 102 whether the buffer is full after storing the received data to the command data buffer area 120, it is possible to assure that there is always sufficient space in the buffer to store the received data in step S304.

If in step S302 the printer can receive data, the CPU 106 detects whether there is any command data buffered to the command data buffer area 120 (step S307). If there is (step S307 returns yes), the buffered command data is sent to the printer 104 by way of printer interface 105 (step S308), the command data buffer area 120 is then cleared (step S309), the command data received in step S301 is sent to the printer 104 (step S310), and the procedure loops back to step S301.

If there is no command data buffered to the command data buffer area 120 (step S307 returns no), the procedure advances to step S309.

If the printer 104 buffer becomes full while the buffered command data is being sent to the printer 104 in step S308, the data received in step S301 can be grouped with any data remaining in the command data buffer as a new data block.

Experimental Results

An interface device 101 as described above was tested under various operating parameters. The results are described below.

The host interface 103 was an RS-232 standard interface.

The printer interface 105 was a clock synchronized serial interface designed for half duplex communication. The printer interface 105 performs any conversion required for communication with the host, and operates at a communications speed of 1.25 Mbps.

A 40 byte data buffer is reserved in RAM 113 for data buffering.

When data is conventionally sent from the host to the printer using an RS-232 standard convention, the maximum communications rate is 38,400 bps.

However, using an interface device operating with the specifications described above, the communications rate was improved to 115 kbps to 230 kbps, that is, the maximum data transfer rate used by today's most commonly available personal computers. Further experiments also demonstrated that communication at an even higher data transfer rate is also possible.

Embodiment 2

In addition to the functions of the first embodiment described above, command data in this second preferred embodiment of the present invention includes both normal commands and real-time commands where a real-time command sent from the host computer contains a function to be sent immediately to the printer. This second embodiment of the present invention is therefore based on the above-described first embodiment, but differs therefrom in that a real-time command transmission controller is achieved by means of the host interface 103 in conjunction with CPU 106, and that data is also transmitted to the host computer.

Figure 4:
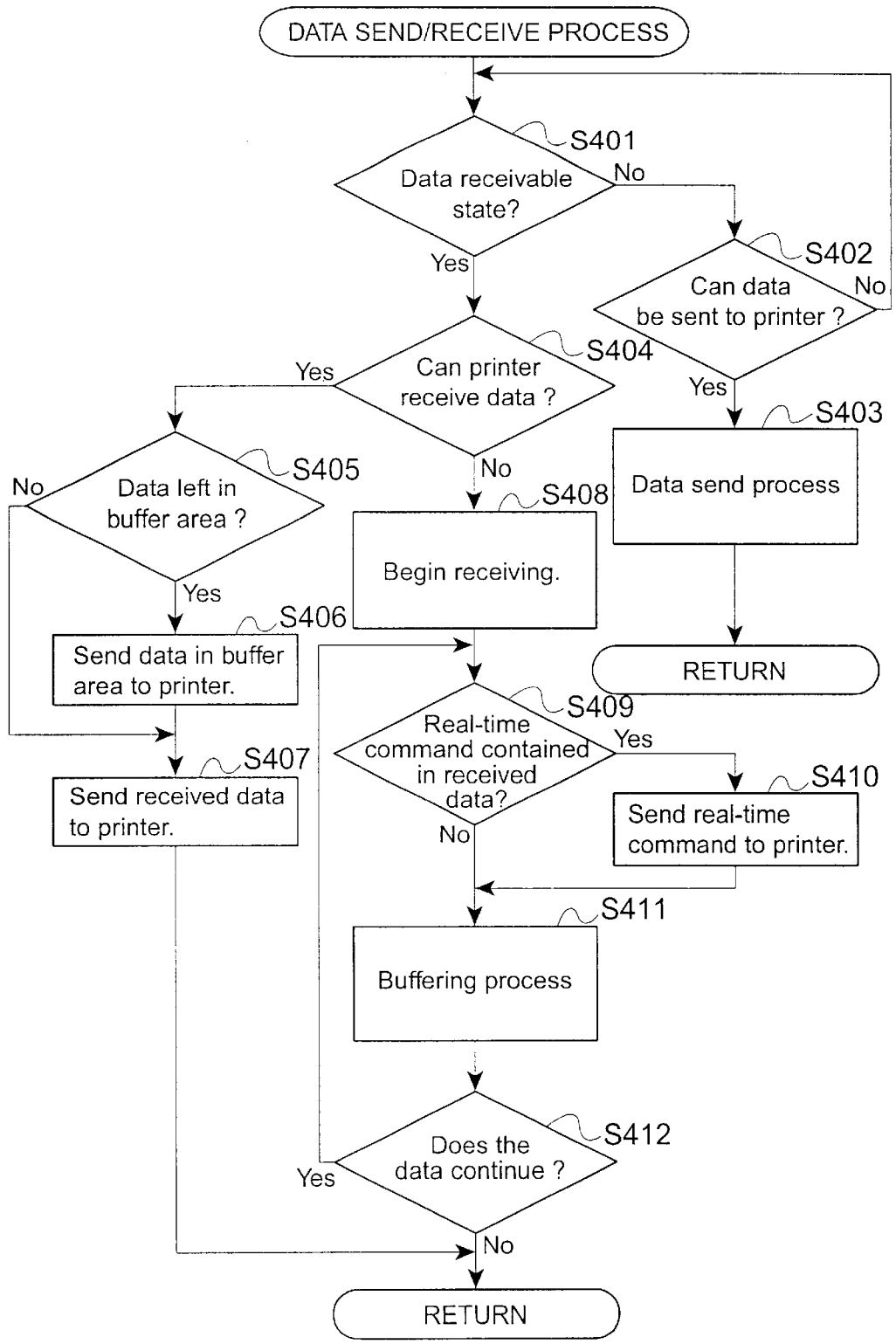
FIG. 4 is a flow chart used to describe a data send and receive process of an interface device according to a second embodiment of the present invention.

A preferred embodiment of a data transmission and receiving process according to this second embodiment of the present invention is described next below with reference to FIG. 4. FIG. 4 is a flow chart of a data transmission and receiving process in an interface device according to this second embodiment of the present invention.

It should be noted that "not in a state in which data can be transmitted to the printer 104" as used below means that the printer 104 cannot receive command data (i.e., a normal command) that is not a real-time command, but can receive a real-time command.

The printer processes the real-time command immediately after it receives the command.

When the data send/receive process begins, the interface device 101 detects whether the host interface 103 process is in a data receive state (step S401).

If the host interface 103 is not in a data receivable state (step S401 returns no), the interface device 101 detects whether data from the host is to be sent to the printer by way of printer interface 105 (step S402).

If data is to be sent to the printer (step S402 returns yes), a data send process for sending received data through the printer interface 105 to the printer (step S403) is performed, and this process ends.

However, if data is not to be sent (step S402 returns no), the procedure loops back to step S401.

If the host interface 103 is in a data receivable state (step S401 returns yes), the interface device 101 detects whether data can be sent to the printer 104 by way of the printer interface 105 (step S404).

If data can be sent (step S404 returns yes), the interface device 101 detects whether previously received data remains in the buffer area of the RAM 113 (step S405). If data remains in the buffer area (step S405 returns yes), the buffered data is transferred to the printer 104 by way of printer interface 105 (step S406). The data received from the host interface 103 is then transferred to the printer 104 by way of the printer interface 105 (step S407), and this process ends.

If there is no previously received data left in the buffer area of the RAM 113 (step S405 returns no), the procedure advances to step S407.

If data cannot be sent to the printer 104 by way of printer interface 105 (step S404 returns no), the interface device 101 receives the data by way of host interface 103 (step S408).

It is next determined whether there are any real-time commands in the received data (step S409). If yes (step S409 returns yes), the received real-time command is sent to the printer by way of printer interface 105 (step S410), and the received data is accumulated in the buffer area of RAM 113 (step S411).

It is then determined whether data receiving can continue (step S412). If there is no further data to receive (step S412 returns no), the process ends.

If there is further data to receive (step S412 returns yes), the procedure loops back to step S409.

It should be noted that, as in the first embodiment above, a process can be performed in step S411 for detecting whether the buffer area of RAM 113 in interface device 101 is full, and if it is, notifying the host computer.

Furthermore, data is accumulated in the buffer area of RAM 113 in step S411 whether or not the received data is a real-time command. However, because real-time commands have already been sent to the printer 104, it is alternatively possible to not accumulate any real-time commands in the buffer.

Embodiment 3

In the above described second embodiment of the invention, the interface device 101 sent real-time commands contained in data received by the interface device 101 immediately to the printer 104. In this case, however, real-time command data may interrupt normal command data transmissions when commands, referred to herein as "normal commands," other than real-time commands are data streams of a sufficient plurality of bytes.

The second embodiment is sufficient when the printer 104 uses a command system whereby real-time commands and normal commands can be differentiated. This type of command system can be achieved by, for example, transmitting data in byte units (8 bit units) where the highest bit is always set (i.e., has a value of 1) to indicate a real-time command, and is always cleared (i.e., set to 0) to indicate a normal command.

The above second embodiment does not, however, allow for compatibility with all existing command systems. This is because unexpected operations can occur when a real-time command interrupts a normal command data stream in existing command systems.

Let us consider, for example, transmitting a data stream as described below from the host computer 102 through interface device 101 to printer 104. It should be noted that "0x" below is a prefix indicating a hexadecimal value, and sending the ASCII code for a certain character is indicated by surrounding the character in quotation marks (" ").

0x1b "t" 0 means to select character code table 0. The last value (0) is the parameter.

0x1b "R" 1 means to select international character set 1. The last value (1) is the parameter.

"0123456789" means to print characters 0 to 9.

0x0a is a carriage return.

0x10 0x04 1 indicates a real-time command requesting the status of the current printer 104.

These commands are sent as shown below from the host computer 102 to the interface device 101.

0x1b "t" 0 0x1b "R" 1 "0123456789" 0x0a 0x10 0x04 1

If the interface device 101 sends this data stream in the above sequence to the printer 104, but the receive buffer of the printer 104 becomes full when 0x1b "t" 0x1b "R" is received and the rest of the data stream cannot therefore be received, real-time command 0x10 0x04 1 is transmitted first by step S410 in the above second embodiment of the invention. The command stream received by the printer 104 is therefore as follows.

0x1b "t" 0 0x1b "R" 0x10 0x04 1 1 "0123456789" 0x0a

When this command stream is received, the printer 104 immediately returns the printer status to the interface device 101 when 0x10 0x04 1 is received, selects character code table 0, then selects international character set 16 (=0x10), skips the following uninterpretable data 0x04 1 1, and prints characters 0 to 9. This is obviously different from the expected operation.

This third embodiment of the present invention is an interface device capable of correctly interpreting received commands even in such cases. When a data stream such as described above is sent from the host computer 102, interface device 101 according to this preferred embodiment functions as follows so that the printer 104 receives a data stream as shown below.

0x1b "t" 0 0x1b "R" 1 0x10 0x04 1 "0123456789" 0x0a

Figure 5:
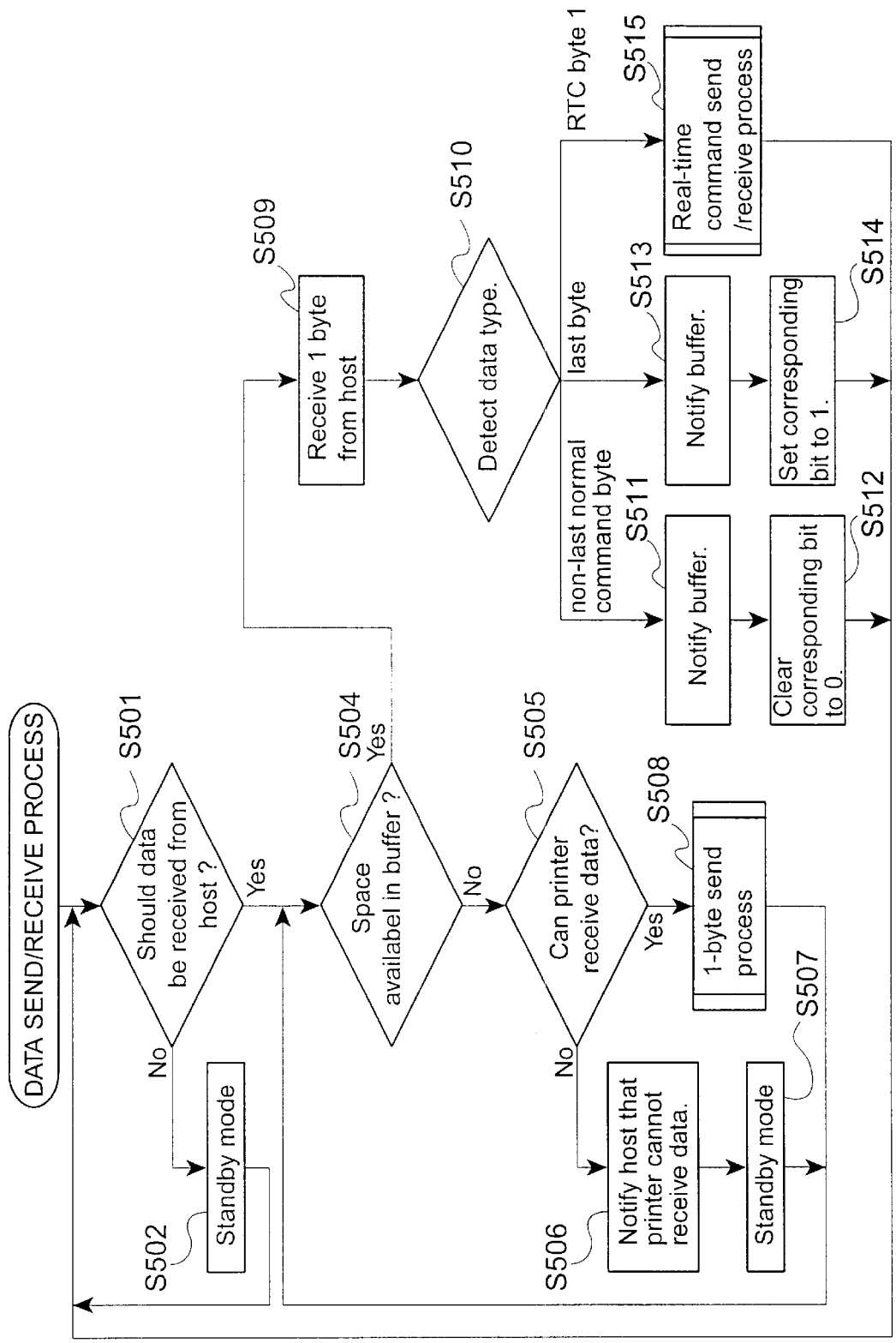
FIG. 5 is a flow chart used to describe a data send and receive process of an interface device according to a third embodiment of the present invention.

FIG. 5 is a flow chart of the data transmission and receiving process of an interface device according to this preferred embodiment of the invention. An interface device according to this third embodiment of the invention is described below with reference to FIG. 5.

When this process starts, the interface device 101 detects whether the host interface 103 is in a state in which it should receive data sent from the host computer (step S501). If not (step S501 returns no), it enters a standby mode (step S502) and then the procedure loops back to step S501. It should be noted that a 1-byte send process described below can be activated by an interrupt during the standby mode of step S502. This 1-byte send process is activated when the printer 104 enters a data receivable state, that is, an opening occurs in the receive buffer. In addition, this 1-byte send process can be repeatedly activated during this standby mode.

If the host interface 103 is in a data receive state (step S501 returns yes), the interface device 101 detects whether space is available in the buffer reserved in its internal RAM 113 (step S504). If not (step S504 returns no), it detects whether the printer 104 is in a data receivable state (step S505). If the printer 104 is not in a data receivable state (step S505 returns no), it so notifies the host computer 102 (step S506), enters a standby mode (step S507), and then the procedure loops back to step S504. It should be noted that a 1-byte send process described below can be activated by an interrupt during the standby mode of step S507. In addition, this 1-byte send process can be repeatedly activated during this standby mode.

If the printer 104 is in a data receivable state (step S505 returns yes), the 1-byte send process described below is run (step S508), and the procedure loops back to step S504.

If space is available in the buffer (step S504 returns yes), data is received through the host interface 103 (step S509). Decision diamond S510 then detects whether the received data is one of the following types (step S510).

last byte of a normal command a normal command byte other than the last byte the first byte of a real-time command If the received data byte is any normal command byte other than the last byte (step S510, non-last normal command byte), the byte is added to the receive buffer (step S511). A flag area comprising a bit sequence corresponding to each byte of the buffer area is also reserved in RAM 113, the corresponding bit in the flag area is therefore cleared to 0 (step S512), and the procedure loops back to step S501.

If the received data byte is a last byte of a normal command (step S510, last byte), the byte is added to the receive buffer (step S513). A flag area comprising a bit sequence corresponding to each byte of the buffer area is also reserved in RAM 113, the corresponding bit in the flag area is therefore cleared to 0 (step S514), and the procedure loops back to step S501.

When a data sequence as shown in the first line below is accumulated in the receive buffer as a result of the above process, the bit sequence stored to the above-noted flag area will be as shown in the second line.

0x1b "t"0 0x1b "R"1"0123456789" 0x0a
0 0 10 01 1111111111 1

When this bit is set to 1, it means that a real-time command can be moved or inserted and transmitted immediately after the byte corresponding to the set bit is sent to the printer 104.

If the received data byte is the first byte in a real-time command (step S510, RTC byte 1), the real-time command send/receive process described below is performed (step S515), and the procedure loops back to step S501.

Figure 6:
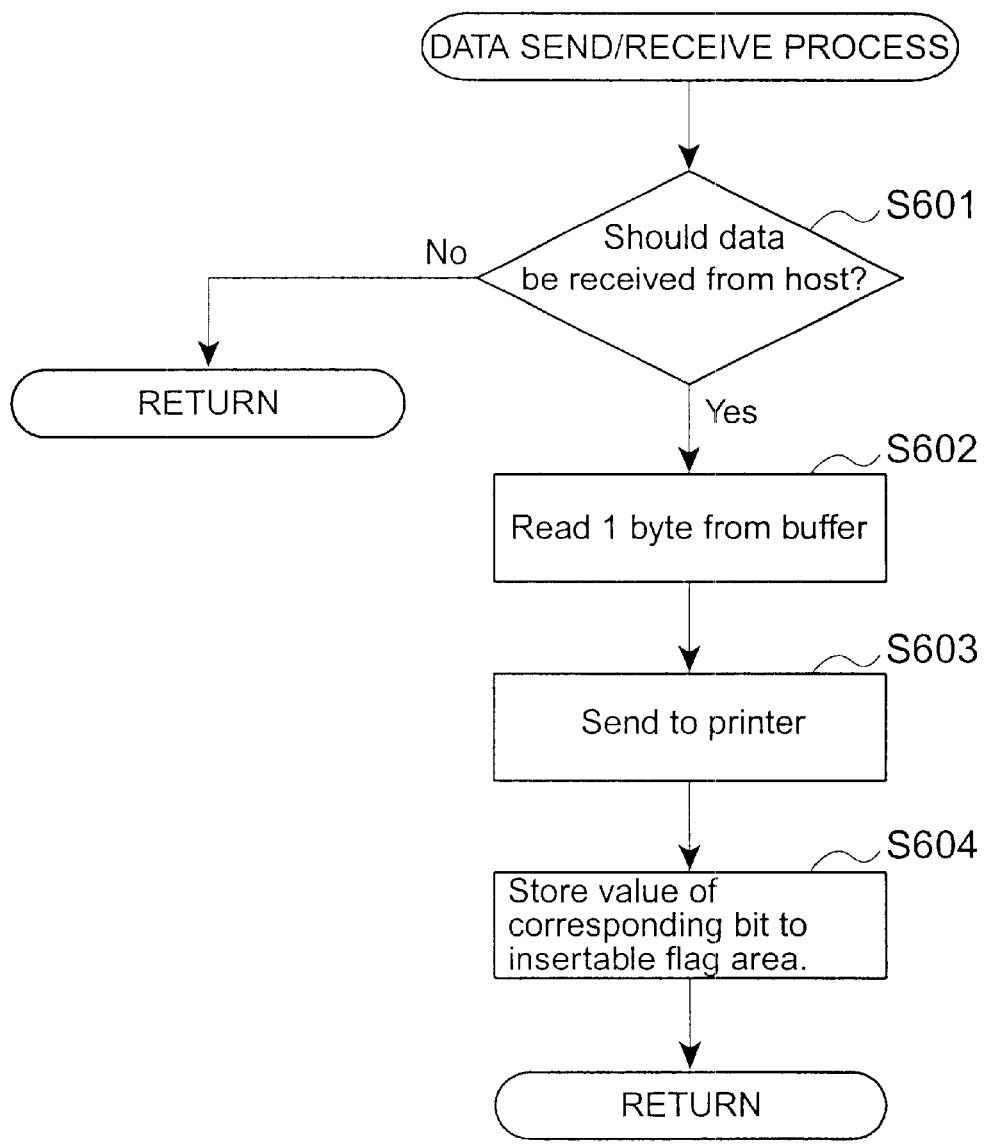
FIG. 6 is a flow chart used to describe a data send and receive process of an interface device according to a third embodiment of the present invention.

FIG. 6 is a flow chart of 1-byte send process control in this preferred embodiment of the invention. As noted above, this 1-byte send process is executed when no space is available in the buffer of interface device 101, or when space becomes available in the receive buffer of the printer 104.

The first step is to detect whether the printer 104 can receive data (step S601). If it cannot (step S601 returns no), control returns to the calling process. If the printer 104 can receive data (step S601 returns yes), 1 byte is read from RAM 113 (step S602), and is sent through printer interface 105 to the printer 104 (step S603). The space is available in the interface device buffer thus increases 1 byte.

The value of the bit in the flag area corresponding to the byte obtained from RAM 113 is then stored to an insertable flag area reserved in RAM 113 (step S604). This means that whether the byte last transmitted by step S603 was the last byte in a command stream is stored in the insertable flag area of RAM 113.

Once this value is stored, the 1-byte send process returns to the calling process.

Figure 7:
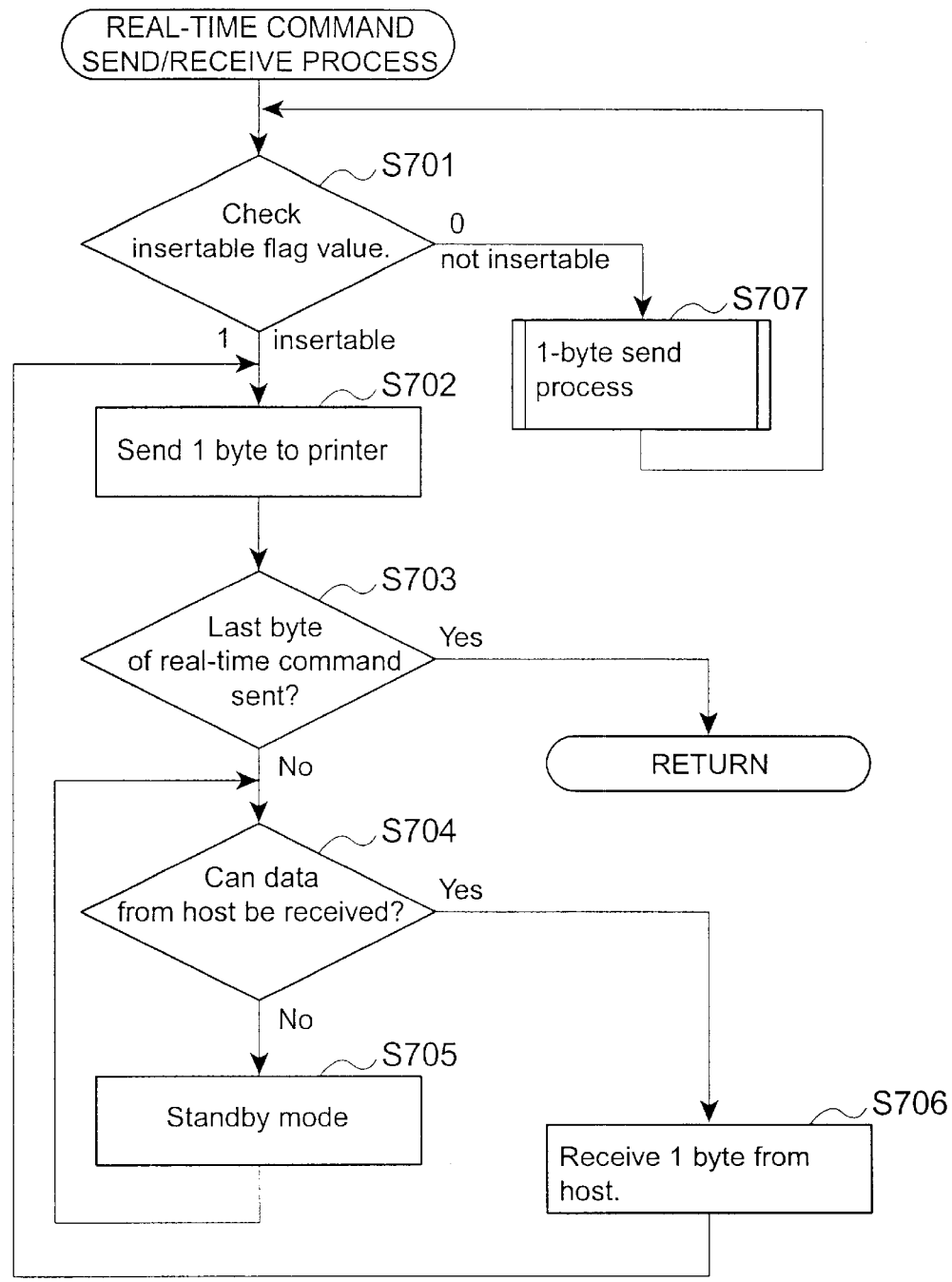
FIG. 7 is a flow chart used to describe a data send and receive process of an interface device according to a third embodiment of the present invention.

FIG. 7 is a flow chart of real-time command send/receive process control in this preferred embodiment of the present invention.

The first step in this process is to check the value of the insertable flag (step S701). If the flag is set to 1, that is, if a real-time command can be inserted (step S701 returns 1), the real-time command byte is sent to the printer 104 (step S702). It should be noted that the printer 104 executes the process corresponding to the received real-time command even if the receive buffer of the printer 104 is full.

Decision diamond S703 then detects whether the last byte of the real-time command was sent in step S702. If it was (step S703 returns yes), the real-time command send/receive process ends and control returns to the calling process.

However, if the complete real-time command data stream has not been sent (step S703 returns no), decision diamond S704 detects whether the host interface 103 should receive data sent from the host computer. If not (step S704 returns no), there is a delay (step S705), and the procedure then loops back to step S704.

If the host interface 103 should receive data sent from the host computer (step S704 returns yes), the transmitted byte is received (step S706), and the procedure loops back to S702.

At the first pass through step S702 the byte received in step S509 is transmitted, but in subsequent loops through step S702 the byte received in step S706 is transmitted to the printer 104.

If the insertable flag is set to 0, that is, if a real-time command cannot be inserted (step S701 returns 0), the 1-byte send process described above is executed (step S707) and the procedure loops back to step S701.

Embodiment 4

Similarly to the embodiment described above, an interface device according to this preferred embodiment of the invention also relates to handling command data containing both normal commands and real-time commands, and prevents a real-time command from being inserted to a normal command.

A. Typical configuration

Figure 8:
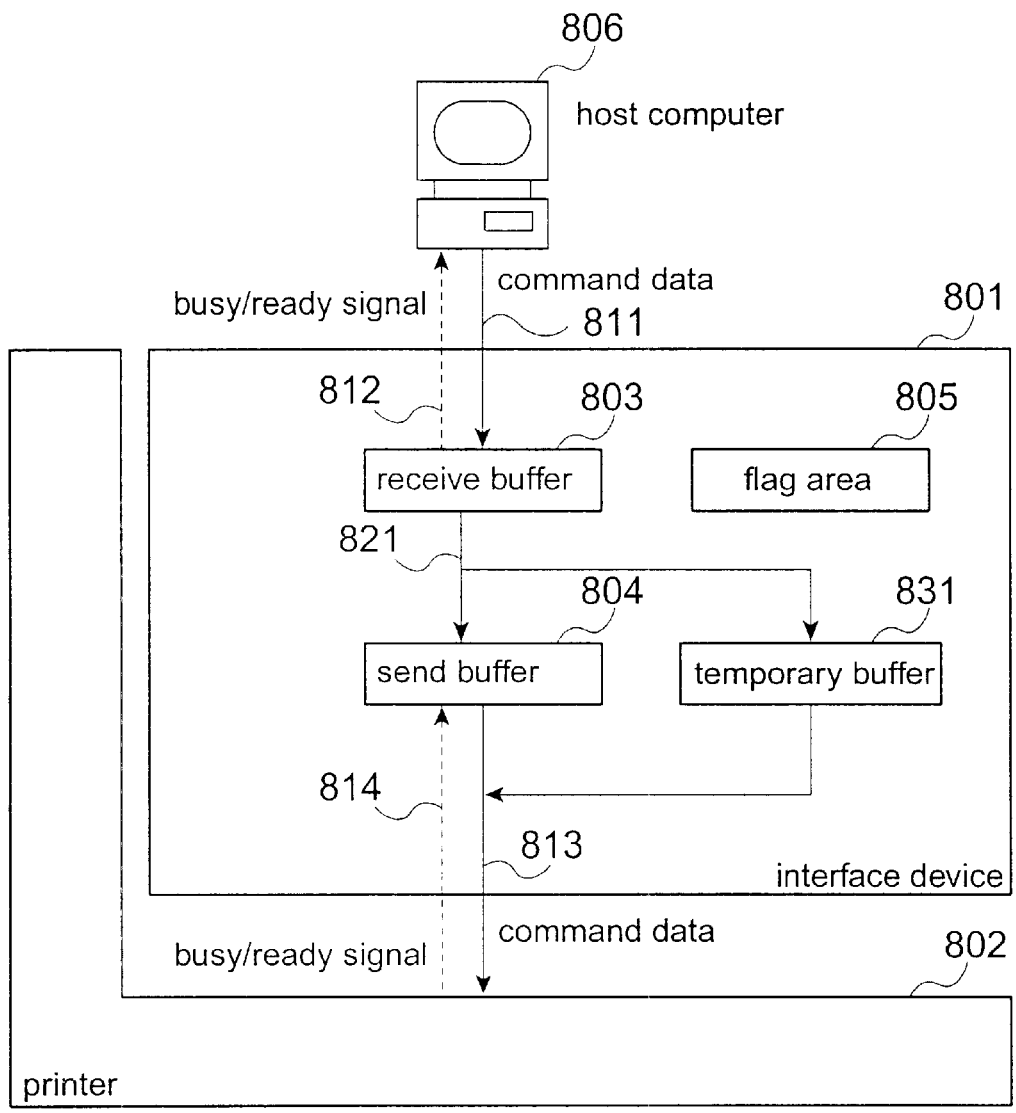
FIG. 8 is a typical block diagram of an interface device according to a fourth embodiment of the present invention.

FIG. 8 is a block diagram showing a typical functional configuration and relationship between an interface device according to this preferred embodiment of the invention and a printer.

As in the above embodiments of the invention, this interface device 801 is inserted to an expansion slot of a printer 802 for connection with the printer 802.

The interface device 801 comprises RAM as temporary storage with a receive buffer 803, send buffer 804, and flag area 805 reserved in RAM. When the flag area 805 is set, that is, stores a non-zero value, the last command data received was a real-time command. A temporary buffer 831 is also reserved in RAM for temporarily storing the command data stream as it is being received if it is not known whether the command stream being received is a real-time command.

The temporary buffer 831 is for temporarily storing a command data byte stream as it is being received.

When command data is sent (811) from the host computer 806, the command data is stored to receive buffer 803. The value of the flag area 805 is also set or cleared accordingly. The command data stored to receive buffer 803 is also appropriately copied (821) to send buffer 804 or temporary buffer 831, and is sent (813) to the printer 802.

A busy/ready signal is sent (813) from the printer 802 to interface device 801, and the interface device 801 monitors the received signal to execute the appropriate process. The interface device 801 also sends (812) the busy/ready signal to the host computer 806.

B. 1-byte receive process

Figure 9:
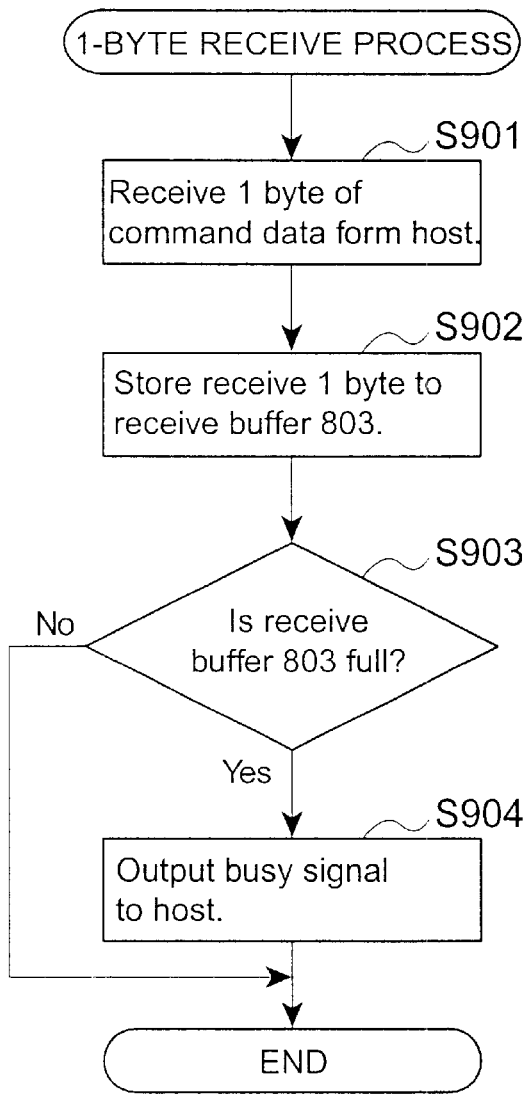
FIG. 9 is a flow chart used to describe a 1-byte receive process in a fourth embodiment of the present invention.

FIG. 9 is a flow chart of a 1-byte receive process activated when command data is sent (811) from the host computer 806 to the interface device 801. This process is activated by a receive interrupt that occurs when command data arrives at the interface device 801.

The first step in this process is for the interface device 801 to read one byte of command data from the host-side interface (not shown in the figure) (step S901).

Next, the read command data is stored to the receive buffer (step S902). Storing to the receive buffer is accomplished by adding data in a FIFO (first in, first out) method. The receive buffer 803 can thus be achieved as a queue of a fixed maximum length (buffer length) using, for example, a ring buffer.

The interface device 801 then detects whether the receive buffer 803 is full (step S903). If the receive buffer 803 is full (step S903 returns yes), the interface device 801 outputs a busy signal to the host computer 806 (step S904), and this process ends.

If the receive buffer 803 is not full (step S903 returns no), this process ends immediately. In this case, the busy/ready signal send state (812) is held as before.

C. Data process

Figure 10:
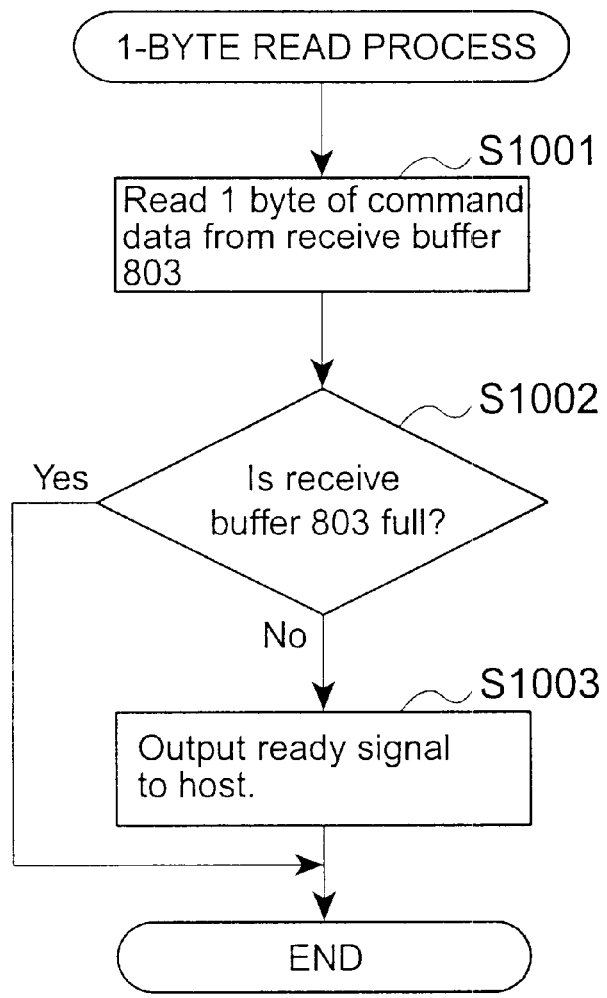
FIG. 10 is a flow chart used to describe a 1-byte read process in a fourth embodiment of the present invention.
Figure 11:
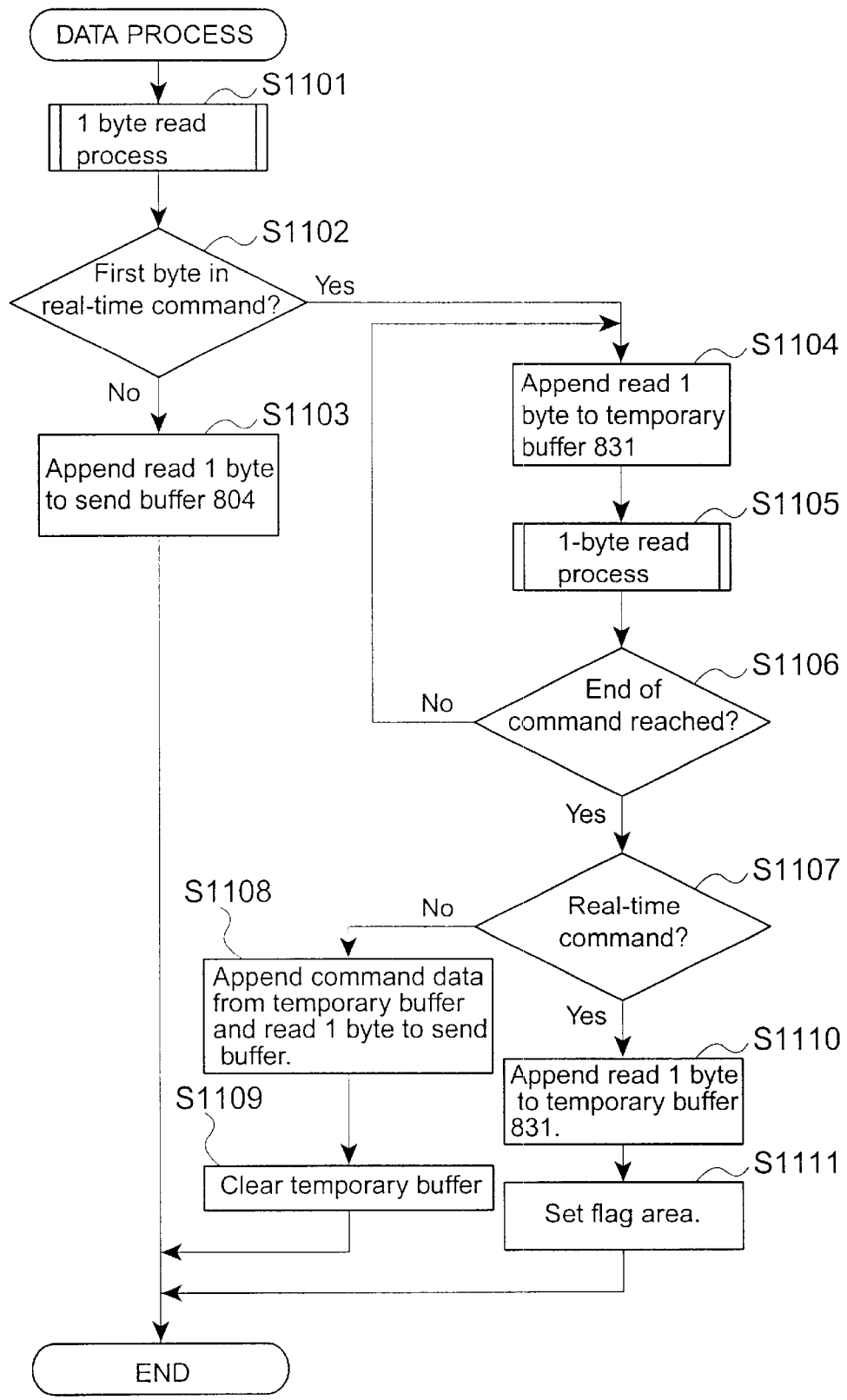
FIG. 11 is a flow chart used to describe a data process of a fourth embodiment of the present invention.

FIG. 10 is a flow chart of a 1-byte read process activated when command data is copied (821) from the receive buffer 803 to the send buffer 804. FIG. 11 is a flow chart of a data process whereby command data is copied, for example, using the above-noted 1-byte read process.

It should be noted that in this exemplary embodiment of the invention this 1-byte read process is called by this data process.

The 1-byte read process is described next below with reference to FIG. 10.

When the 1-byte read process is activated, the interface device 801 reads one byte from the beginning of the receive buffer 803, and stores the read byte to a register, for example, in the CPU (not shown in the figure) of the interface device 801 (step S1001). As noted above, the receive buffer 803 is a FIFO queue, and the first byte is therefore the oldest byte of command data received and stored to the receive buffer 803.

After reading one byte in step S1001, the interface device 801 detects whether the receive buffer 803 is full (step S1002). If the receive buffer 803 is not full (step S1002 returns no), the interface device 801 sends a ready signal to the host computer 806 (step S1003), and this process ends.

If the receive buffer 803 is full (step S1002 returns yes), this process terminates immediately. In this case, the busy/ready signal send state (812) is held as before.

The above-noted data process is described next with reference to FIG. 11. It should be noted that this data process is activated when data is stored to the receive buffer 803. The timing at which this data process is executed can be appropriately selected according to the objective and application. For example, the data process can be activated by a timer interrupt occurring at a specific time interval, when there is not other process to be performed, when the receive buffer 803 becomes full, or using a combination of these methods.

When this data process starts, the above-described 1-byte read process is executed (step S1101). The interface device 801 then detects whether the command data read into a register, for example, by the 1-byte read process (step S1101) is the first byte of a real-time command (step S1102).

If a command system as described above is used, the first byte of a real-time command is 0x10, but the invention shall not be so limited as other real-time command formats can be alternatively used. It is also possible for 0x10 to be sent as part of a normal command.

If the read byte is not the first byte of a real-time command (step S1102 returns no), the byte is added to the send buffer 804 (step S1103), and this process ends. It should be noted that the send buffer 804 is, like the receive buffer 803, a FIFO type queue.

If the read byte is the first byte of a real-time command (step S1102 returns yes), the byte is added to the temporary buffer 831 (step S1104).

The 1-byte read process is then performed again (step S1105), and the interface device 801 detects whether that read command data byte is the last byte in the command (step S1106). If not (step S1106 returns no), the procedure loops back to step S1103.

If the read command data byte is the last byte in the command (step S1106 returns yes), interface device 801 detects whether the command data sequence comprising the command data (sequence) stored to the temporary buffer 831 and the command data read in step S1104 combine to form a real-time command (step S1107).

If a real-time command is not formed (step S1107 returns no), the command data (sequence) stored to temporary buffer 831 and the last read command data byte are copied sequentially to the send buffer 804 (step S1108), the temporary buffer 831 is cleared (step S1109), and this process ends.

If a real-time command is formed (step S1107 returns yes), the read byte is added to the temporary buffer 831 (step S1110), the flag area 805 is set (step S1111), and this process ends.

D. Send process

Figure 12:
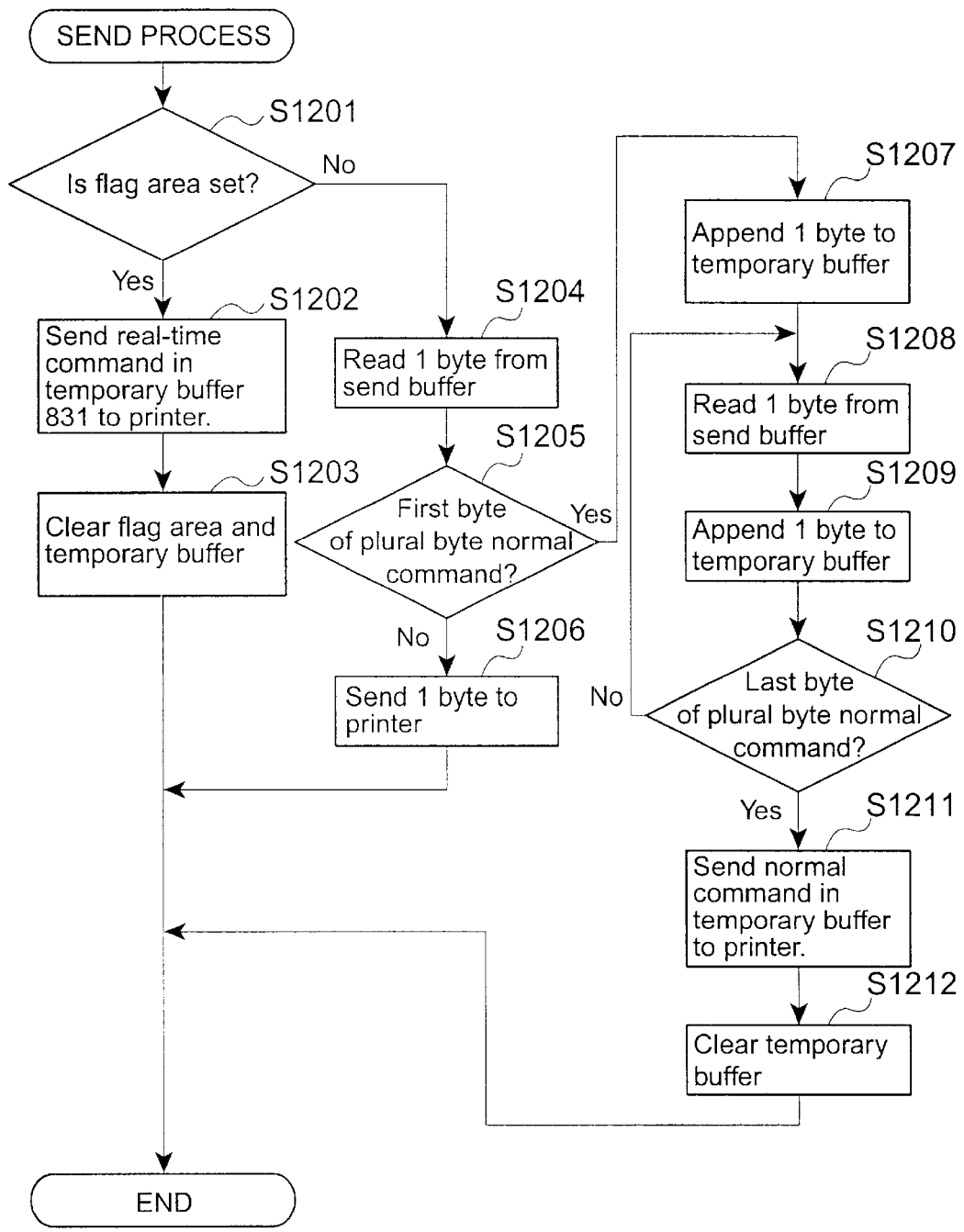
FIG. 12 is a flow chart used to describe a data transmission process of a fourth embodiment of the present invention.

FIG. 12 is a flow chart of send process control whereby the interface device 801 sends (812) command data stored to the send buffer 804 to the printer 802. It should be noted that this send process is started when data is stored to the send buffer 804 or temporary buffer 831. The timing at which this process is executed can be appropriately selected according to the objective and application. For example, the process can be activated by a timer interrupt occurring at a specific time interval, when there is not other process to be performed, when the send buffer 804 becomes full, when the flag area 805 is set, or using a combination of these methods.

The send process is described next below with reference to FIG. 12.

When the transmission process starts, the interface device 801 detects whether the flag area 805 is set (step S1201). If it is (step S1201 returns yes), the command data sequence for the real-time command stored to temporary buffer 831 is sent to the printer 802 (step S1202), the flag area 805 and temporary buffer 831 are cleared (step S1203), and this process ends.

It should be noted that the busy/ready signal state of the printer 802 is not checked when the real-time command is sent to the printer 802. This is because a real-time command is sent to the printer 802 even when the printer 802 is busy.

If the flag area 805 is not set (step S1201 returns no), 1 byte is read from the send buffer 804 (step S1204), and the interface device 801 detects whether the read one byte is the first byte in a normal command comprising a plurality of bytes (step S1205).

If this byte is not the first byte or if the normal command is only one byte long (step S1205 returns no), the read one byte is sent (step S1206) and this process ends.

If the read byte is the first byte of a normal command comprising a plurality of bytes (step S1205 returns yes), the one byte is added to the temporary buffer 831 (step S1207), one byte is read from the send buffer 804 (step S1208) and added to the temporary buffer 831 (step S1209). Decision diamond S1210 then detects whether this one byte completes the command. If not (step S1210 returns no), the procedure loops back to step S1208. If the byte completes the command (step S1210 returns yes), the command data sequence of the normal command stored to temporary buffer 831 is sent to the printer 802 (step S1211), the temporary buffer 831 is cleared (step S1212), and this process ends.

It should be noted that transmission in step S1206 and step S1211 first detects the state of the busy/ready signal from the printer 802, and waits for the printer 802 to enter a ready state before transmission begins if the printer 802 is busy.

As a result of this process, a real-time command is first interpreted by the interface device 801 and a flag area 805 is set if the command is to be sent. As a result, a real-time command is sent with priority over other command data already stored to the send buffer 804.

Real-time commands are also not mixed with other commands because the flag area 805 is not checked when a command sequence for a normal command is being transmitted.

It will also be obvious to one with ordinary skill in the related art that the sequence of the above described processes of these preferred embodiments of the invention are only typical of the invention and can be varied in many ways for execution by an interface device according to the present invention. All such variations are also included within the scope of the present invention.

Effects of the Invention

Some of the merits and benefits of the present invention are described below.

An interface device for a printer and a control method for the interface device can be provided such that the interface device is installed to an expansion slot of the printer and connected to a host computer to receive data sent by the host computer while monitoring the data buffering status of the printer so that data from the host computer can be appropriately buffered and sent to the printer by the interface device.

It is also possible to provide a printer interface device and interface device control method whereby the host computer can be notified when the interface device cannot buffer data from the host computer.

It is therefore possible to shorten the data transmission delay time of the host computer, and thus provide a printer interface device and interface device control method suitable for increasing the speed of a printing process.

It is yet further possible to provide a printer interface device and interface device control method suitable for reducing cost by using a low cost connector for communication with the printer.

It is yet further possible to provide a printer interface device and interface device control method whereby office space can be saved and appearance can be improved by installing the interface device inside the printer.

It is yet further possible to provide a printer interface device and interface device control method whereby real-time commands and other command data that should be sent to the printer with priority over other normal commands are reliably sent to the printer and buffering is adapted to the characteristics of the command data sent from a host computer when the printer is compatible with processing such real-time commands and other priority commands.

The interface device control method of the invention can also be provided in the form of a software program recorded to a data storage medium, which can then be easily distributed and sold independently of the interface device. An interface device and interface device control method according to the present invention can also be achieved as a result of an interface device executing this program of the present invention recorded to a data storage medium Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. An interface device installable to a printer, comprising:
    (a) a receiving means for receiving data sent by a host computer in communication with the interface device;
    (b) a transmission means for sending said data to a printer in which the interface device is installed;
    (c) a detecting means for detecting whether said printer can receive said data;
    (d) a storage means for storing data received by said receiving means when the detecting means detects that the printer cannot receive data;
    (e) a control means for controlling the transmission means to send data stored in the storage means and then send data received by the receiving means after the detecting means detects that the printer can receive data when the detecting means detects that the printer can receive data;
    (f) a discriminating means for detecting if said storage means can store further data;
    (g) a notifying means for notifying the host computer when the discriminating means detects that further data storage is not possible; and
    (h) a real-time command transmission control means for controlling said transmission means to send data received by the receiving means when said data is a real-time command when the detecting means detects that the printer cannot receive data.

2. An interface device for interfacing between a host device and a printer, the interface device comprising:
    a receiver configured to receive data including normal commands and to receive real-time commands from the host device;
    a storage medium configured to store data received by the receiver;
    a transmitter configured to send data to the printer;
    a detector configured to determine whether or not the printer can receive data;
    a transmission controller configured to control the transmitter to
        send data and real-time commands received by the receiver and stored in the storage medium first and then send data and real-time commands received by the receiver but not stored in the storage medium, if and when the detector determines that the printer can receive data, and
        send real-time commands received by the receiver and store any data received by the receiver in the storage medium, if and when the detector determines that the printer cannot receive data.

3. An interface device as recited in claim 2, further comprising a discriminator configured to determine whether or not the storage medium can receive more data.

4. An interface device as recited in claim 3, further comprising a notifier configured to notify the host device when the discriminator determines that the storage medium cannot receive more data.

5. An interface device for interfacing between a host device and a printer, the interface device comprising:
    a receiver configured to receive data including normal commands and real-time commands from the host device;
    a storage medium configured to store data received by the receiver;
    a discriminator configured to determine whether or not the storage medium is full;

a controller configured to control the handling of received data by:
    initiating a specific data send process, if and when the discriminator determines that the storage medium is full and that the printer can receive data, and
    receiving a predetermined amount of data from the host device and detecting the type of the received predetermined amount of data, if and when the discriminator determines that the storage medium is not full.

6. An interface device as recited in claim 5, wherein the specific data send process is a 1-byte send process.

7. An interface device as recited in claim 5, wherein the data type detecting comprises determining whether the received predetermined amount of data is the last byte of a normal command, a non-last byte of a normal command, or the first byte of a real time command.

8. An interface device as recited in claim 7, wherein the received predetermined amount of data is handled according to whether it is a last byte of a normal command, a non-last byte of a normal command, or the first byte of a real time command.

9. An interface device installable to a printer, comprising:
(a) a receiver configured to receive data sent by a host computer in communication with the interface device;
(b) a transmitter configured to send the data to a printer in which the interface device is installed;
(c) a detector configured to detect whether the printer can receive the data;
(d) a storage medium configured to store data received by the receiver when the detector detects that the printer cannot receive data;
(e) a controller configured to control the transmitter to send data stored in the storage medium and then send data received by the receiver after the detector detects that the printer can receive data when the detector detects that the printer can receive data;
(f) a discriminator configured to detect if the storage medium can store further data;
(g) a notifier configured to notify the host computer when the discriminator detects that further data storage is not possible; and
(h) a real-time command transmission controller configured to control the transmitter to send data received by the receiver when the data is a real-time command when the detector detects that the printer cannot receive data.

10. A control method for an interface device installable to a printer, comprising the following steps:
(a1) receiving, in a receiver, data including normal commands sent by a host computer;
(a2) receiving, in a receiver, real-time commands sent by a host computer;
(b) storing, in a storage medium, at least some of said data received by the receiver;
(c) detecting, using a detector, whether said printer can receive data;
(d) sending, via a transmitter, data and real-time commands received by the receiver and stored in the storage medium first and then sending data and real-time commands received by the receiver but not stored in the storage medium, if and when the detector determines that said printer can receive data; and
(e) sending, via the transmitter, real-time commands received by the receiver and storing any data received by the receiver in the storage medium, if and when the detector determines that said printer cannot receive data.

11. A data storage medium containing a program of instructions for directing an interface device installable to a printer to perform a control method, the program comprising:
(a1) receiving, in a receiver, data including normal commands sent by a host computer;
(a2) receiving, in a receiver, real-time commands sent by a host computer;
(b) storing, in a storage medium, at least some of said data received by the receiver;
(c) detecting, using a detector, whether said printer can receive data;
(d) sending, via a transmitter, data and real-time commands received by the receiver and stored in the storage medium first and then sending data and real-time commands received by the receiver but not stored in the storage medium, if and when the detector determines that said printer can receive data; and
(e) sending, via the transmitter, real-time commands received by the receiver and storing any data received by the receiver in the storage medium, if and when the detector determines that said printer cannot receive data.

12. An interface device adapted to be mounted in a printer for connecting the printer to a host computer and for transferring command data from the host computer to the printer, the interface device comprising:
a first interface for detachably connecting the interface device to the host computer and for receiving command data from the host computer, the command data including two distinct types of command data, real-time command data and non-real-time command data;
a second interface for detachably connecting the interface device to the printer, for sending the command data to the printer and for receiving status information from the printer indicating whether or not the printer is ready to receive data;
a detector responsive to the second interface for detecting a first state when the status information indicates the printer is ready to receive data, and to detect a second state, otherwise;
a command interpreter for detecting any real-time command data among the command data received by the first interface; and
a command transmission controller for causing the second interface to send real-time command data irrespective of whether the detector detects the first or the second state, while causing the second interface to send non-real-time command data only if the detector detects the first state.

* * * * *